Figure 1:
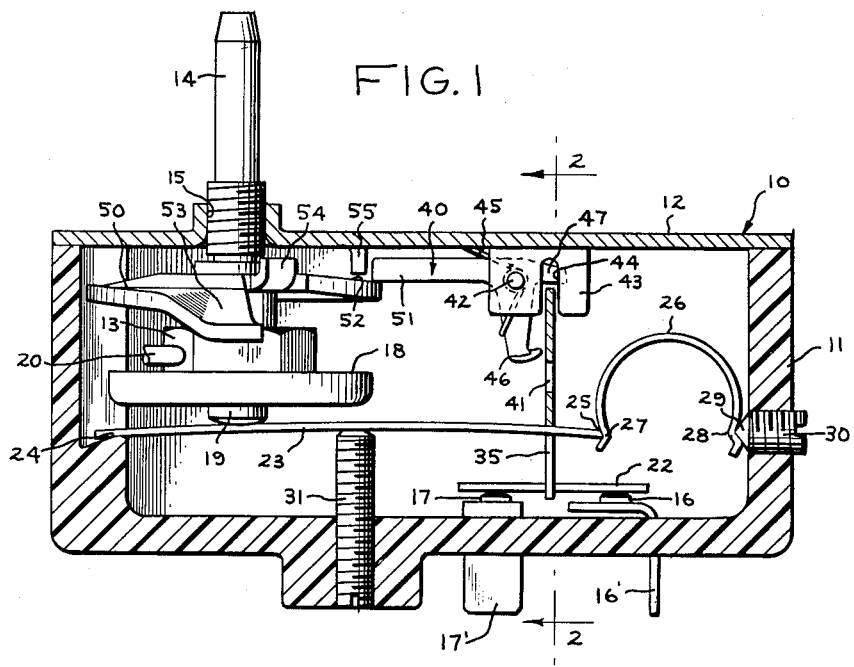

July 2, 1963 R. L. DILLS 3,096,420
OVEN THERMOSTAT
Filed Dec. 27, 1960

INVENTOR.
RAYMOND L. DILLS
BY Richard L. Caslin
HIS ATTORNEY

United States Patent Office 3,096,420
Patented July 2, 1963

3,096,420
OVEN THERMOSTAT
Raymond L. Dills, Louisville, Ky., assignor to General Electric Company, a corporation of New York
Filed Dec. 27, 1960, Ser. No. 78,615
5 Claims. (Cl. 200—140)

The present invention relates to a temperature responsive control device and particularly a hydraulic thermostat for use with a domestic oven.

Hydraulic thermostats having an elongated bulb or probe formed at the end of a capillary tube that is joined at the other end to a bellows or diaphragm within the thermostat housing, of the general type shown in the Ettinger Patent No. 2,260,014, have been widely used as oven thermostats for many years. The normal oven cooking temperatures have all been below about 550° F. maximum, and the thermally responsive fluid used in the hydraulic control system has been able to withstand this amount of temperature without difficulty, but the known thermally responsive fluids cannot be operated at temperatures much above this value.

Recently, ovens have been designed with an automatic heat cleaning cycle whereby the temperature within the oven is raised within the range between 750° F. and 950° F. so as to burn off all food soil and leave the walls of the oven cavity perfectly clean as is taught in an earlier copending application of Bohdan Hurko, Serial No. 27,926, filed May 9, 1960, which application is assigned to the General Electric Company, assignee of this invention.

Protective arrangements have also been devised for shielding the thermostat bulb during the heat cleaning cycle so that the fluid within the hydraulic thermostat system does not experience a temperature greater than its maximum allowable temperature of about 550° F. although the oven temperature might rise as high as 950° F. A typical shielding system is described and claimed in the earlier copending application of Christian A. Eff, Serial No. 48,002, filed August 8, 1960, which application is also assigned to the General Electric Company, assignee of the present application.

The function of the thermostat of the present invention is to operate as a control device in an oven of the type taught by Eff where the thermostat has two ranges of operation. The first range is the normal cooking range wherein the thermostat will operate in the conventional manner through all of the normal cooking temperatures up to a maximum of about 550° F. When it is desired to clean the oven automatically by burning off the food soil, the thermostat will be set to a special oven cleaning position. The thermostat includes a lock-out mechanism for holding the switch contacts of the thermostat in an open circuit position after the shielded thermostat probe registers a predetermined maximum temperature in the vicinity of 550° F. so that the heating elements of the oven will be de-energized and remain in the Off position until the thermostat is reset to a normal cooking temperature.

The principal object of the present invention is to provide a temperature responsive control device with an automatic cut-off arrangement for de-energizing the circuit once the temperature reaches a predetermined maximum temperature.

A further object of the present invention is to provide an oven thermostat with an automatic cut-off feature which is settable by the single control knob of the thermostat so that the thermostat may operate both as a normal thermostat within the cooking range of temperatures and as an automatic cut-off thermostat for effecting a one-cycle oven cleaning operation.

The present invention is incorporated in an oven thermostat which comprises a hollow housing with a manually adjustable expansible member mounted in one wall of the housing. This expansible member expands or contracts according to the direction and extent of the temperature change of a fluid within the thermostat bulb that has a relatively high coefficient of thermal expansion. Fixed switch contact means are mounted within the housing and movable switch contact means are supported from a snap-acting switch mechanism which is in turn motivated by the expansible member for making and breaking an electric circuit through the fixed contacts. Connecting the movable switch contact means to the snap-acting switch mechanism is an insulating plate that is guided for reciprocating movement within the housing during the switch opening and closing actions. The lock-out mechanism includes a spring-biased pawl that cooperates with a keeper portion on the insulating plate, so that when the thermostat bulb experiences a predetermined maximum temperature during the oven cleaning cycle, the snap-acting spring mechanism of the thermostat will open the movable contact means, and the pawl will engage with the keeper portion of the plate to latch the contacts in the open circuit position. In order to gain the advantage of this automatic cut-out feature while retaining the advantage of a standard thermostat, the expansible member is provided with a camming portion for disabling the locking action of the pawl except when the thermostat is set in the oven cleaning position.

My invention will be better understood from the following description taken in connection with the accompanying drawing and its scope will be pointed out in the appended claims.

Figure 2:
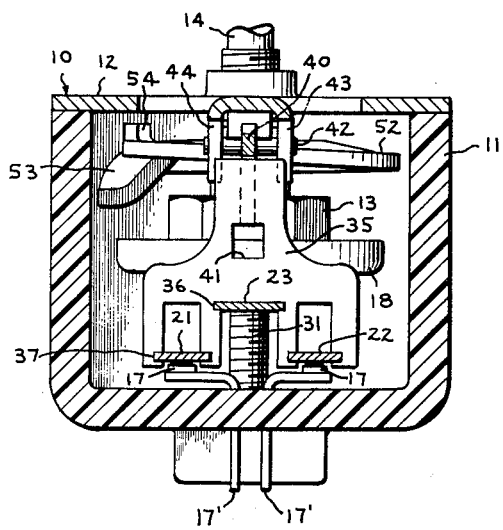

FIGURE 1 is a longitudinal cross-sectional elevational view taken through the center of the housing of an oven thermostat embodying the present invention; and FIGURE 2 is a transverse cross-sectional elevational view of the thermostat housing of FIGURE 1 taken on the line 2—2 of FIGURE 1.

Referring in detail to the drawing and in particular to FIGURE 1, 10 represents a recessed housing of a thermostat embodying the present invention. This housing is formed by a molded insulating base 11 of phenolic resin or the like and a metal cover plate 12 that is fastened by suitable screw means (not shown) to the base. A manually adjustable expansible member 13 in the form of a diaphragm unit is mounted by means of its externally threaded control shaft 14 in a threaded opening 15 of the cover plate 12. This thermostat also includes a single-throw double-pole switch mechanism in the form of two pairs of fixed switch contacts 16 and 17 for opening and closing both sides of the line of an electric circuit; as for example, the power supply circuit for the heating elements of an electric oven. These fixed contacts 16 and 17 are fastened on the bottom wall of the base 11 by suitable spade terminals 16' and 17' which extend through the bottom wall and are staked in place. The diaphragm unit 13 is a standard item that comprises two shallow cuplike members 18 arranged one within the other and hermetically sealed together at their outer edges. One of these cup members is circumferentially corrugated to increase the flexibility of that member, and a centrally disposed embossment in the form of button 19 is associated with the corrugated wall to serve as an outward force-transmitting member as will be better understood hereinafter.

Leading off from one side of the diaphragm unit 13 is a length of capillary tubing 20 which is of such length that it is capable of extending outwardly through a suitable opening in the thermostat housing 10 and for about two feet therebeyond where it is joined at its outer end to a thermostat bulb or probe (not shown) which is adapted to be positioned within an oven or other heated enclosure in which the temperature is to be controlled. The diaphragm unit 13, the capillary tubing 20 and the thermostat bulb (not shown) form a closed system which is filled with a suitable thermally responsive fluid having a relatively high coefficient of thermal expansion and the property of retaining its characteristics throughout normal operating temperatures up to about 600° F. The closed system when charged with the thermally responsive fluid provides a hydraulic thermal motor which is adapted to produce mechanical movement in the diaphragm unit in response to the expansion and contraction of the fluid as the function of the temperature change thereof.

It is important to be able to transmit the motion present in the diaphragm unit 13 to the movable switch contact means represented by a pair of bridging contact members 21 and 22 shown in FIGURE 2 which are adapted to make connection across the two pairs of fixed contacts 16 and 17 of FIGURE 1 for closing the power circuit of the device whose temperature is to be controlled. A standard snap-acting spring mechanism is used for this purpose; namely, a long leaf spring 23 which is fixed at one end 24 while its other end 25 is in engagement with one end of a compressed U-shaped spring member 26 which is adapted to provide a quick opening and closing action for the bridging contact members 21 and 22. The U-shaped spring 26 is provided at the outer sides of its two ends with two V-shaped bearing points 27 and 28 so as to reduce the frictional resistance with the knife edge end 25 of the leaf spring 23 at one end and at the other end with a pointed end 29 of an adjustment screw 30 threaded through a side wall of the thermostat housing. This adjusting screw 30 is designed to adjust the compression force on the U-shaped spring 26 and control the differential in temperature between the open and the closed position during the cycling of the movable contacts. A second adjusting screw 31 is threaded up through an opening in the bottom wall of the base 11 directly beneath the leaf spring 23 and near the center thereof to serve as a calibrating screw so that the temperature setting of the thermostat will correspond accurately to the temperature within the enclosure whose temperature is to be controlled such as the oven of an electric range.

An operating connection must be made between the leaf spring 23 of the spring mechanism and the pair of bridging contact members 21 and 22 so that the movement of the spring will directly affect the movement of the bridging contacts. Such a connection is made by an insulating plate 35 which has a slot 36 adjacent its central portion so that the leaf spring may extend therethrough. The lower edge of the insulating plate has a pair of similar slots 37 for receiving the two bridging contacts 21 and 22 therethrough. Accordingly it will be understood that the leaf spring 23 and the bridging contacts 21 and 22 extending horizontally in a generally parallel relation to each other and are joined together by the insulating plate 35 to move in unison. The force-transmitting button 19 of the diaphragm unit 13 bears down on the top of the leaf spring at a point that is appproximately midway between the fixed end 24 of the leaf spring and the bearing point of the calibration screw 31. Hence, a downward force on the leaf spring applied by the diaphragm unit 13 due to the expansion of the fluid therein will cause the leaf spring 23 to bow downwardly about the calibration screw 31 as a fulcrum so that the knife edge end 25 of the leaf spring will flex upwardly until it moves above the pointed end 29 of the adjusting screw 30 at which time the U-shaped spring 26 will expand rapidly and throw the leaf spring upwardly with a snap action to open the circuit between the two pairs of fixed contacts 16 and 17. There is enough spring action in the leaf spring 23 so that if the downward force of the diaphragm unit were withdrawn due to the contraction of the fluid therein the reverse action would take place and the knife edge end of the leaf spring would slowly move downward until it moved below the pointed end 29 of the adjustment screw 30 at which time the U-shaped spring 26 will expand again and throw the leaf spring downwardly to close the circuit between the fixed contacts 16 and 17.

What has been described above with relation to the details of the operating mechanism of the thermostat are more or less standard features that are available in production thermostats of the hydraulic type. As mentioned previously the fluid used in the thermostat bulb and diaphragm assembly is not capable of withstanding a temperature above about 600° F., although a maximum oven cleaning temperature varies from about 750° F. to about 950° F. Accordingly, thermostat bulb shielding systems have been devised such as is taught in the previously mentioned application of Christian A. Eff, wherein is taught the use of a movable shielding means that is placed over the bulb to draw off the heat from around the thermostat bulb and carry it out of the oven so that the temperature of the thermostat bulb will never rise above 600° F. In such a system as disclosed by Eff it is necessary to have an automatic cut-off for the thermostat so that when the oven air temperature reaches the maximum desired temperature the current flow will be disrupted and the oven will be allowed to cool down to room temperature. Such a heat cleaning process has been termed a "one-cycle" operation wherein the temperature is raised from room temperature to the maximum oven cleaning temperature and then the heating elements are de-energized so that the temperature may return to room temperature. It is considered advantageous to be able to use a standard thermostat with a heat cleaning oven because its service record has proved over the years that it is a reliable device and one which can be made at a reasonable cost. During the heat cleaning cycle it is desirable to cut off the thermostat once the temperature reaches the maximum temperature of about 600° F. so that the switch contacts will not cycle On and Off and hold the temperature at this high level unnecessarily for any length of time.

The present invention is designed to provide a hydraulic thermostat with an automatic cut-out feature so that when the temperature reaches a maximum predetermined temperature the bridging contacts snap open and a pivoted pawl 40 will engage in a suitable opening or keeper portion 41 in the insulating plate 35 to prevent any further movement of the insulating plate and lock the pair of bridging contacts 21 and 22 in the open circuit position. The pawl 40 has a latch portion 46, a short limit arm 47 and a long trip arm 51. The pawl is centrally supported on a pivot pin 42 that extends through a pair of parallel ears 43 that have been lanced down out of the top cover plate 12 as is best shown in FIGURE 2. These lanced ears 43 are also vertically slotted as at 44 from their bottom edges upwardly for receiving the top portion of the insulating plate 35 and guiding the vertical movement of the plate as it reciprocates during the normal opening and closing of the switch contacts. A torsion spring 45 of wire form is wound around a portion of the pivot pin 42 of the pawl to normally urge the latch portion 46 of the pawl counterclockwise in FIG. 1 into engagement with the insulating plate 35. Further describing the pawl, short limit arm 47 is generally horizontally disposed from the pivot pin 42 as is best seen in FIGURE 1 to serve as a stop arm for the upward movement of the insulating plate 35 to limit the travel of the plate and hence the flexure of the leaf spring 23 as the switch contacts are opened. Such a stop means is necessary in order to limit the amount of flexure of the spring part so that the springs will not take a permanent set due to overstressing.

The automatic cut-out feature of the present invention works well during an oven cleaning cycle, but it would not be desirable to have it in operation during normal cooking because it would cut off the oven whenever the bridging contacts 21 and 22 opened a sufficient amount to allow the latching portion 46 of the pawl 40 to engage in the keeper portion of the plate 35. Accordingly, I have devised an adjustable camming means 50 which is of disk shape and positioned on the shaft 14 of the diaphragm unit 13 within the base 11 for cooperation with the long trip arm 51 of the pivoted pawl 40 of the automatic cut-out mechanism. This cam 50 is of rather simple form with a generally flat section 52 for nearly its entire periphery except for a sharp drop-off portion 53 as is best seen in FIGURE 1 which frees the arm 51 of the pawl for engagement of the latch portion 46 in the slotted opening or keeper portion 41 of the insulating plate 35 as the plate rises when the oven air temperature reaches the maximum oven cleaning temperature. In other words, the drop-off point 53 of the cam represents the oven cleaning setting of the thermostat and it allows the pawl freedom of movement for cooperating with the slotted opening 41 of the insulating plate 35.

During normal cooking the thermostat handle would be adjusted to an angular position that causes the cam 50 to pick up the trip arm 51 of the pawl so that the arm is supported on the flat portion 52 of the cam as shown in FIGURE 1. When the pawl 40 is so supported the latching portion 46 is disabled from engaging the slotted opening in the insulating plate 35 thus allowing the contacts 16 and 17 to be bridged by contacts 21 and 22. The cam 50 also includes a lanced tab 54 which projects upwardly a slight amount for cooperation with a downwardly lanced stop finger 55 that is struck out of the metal cover plate 12 of the thermostat housing to limit the angular movement of the shaft to an amount less than 360° F. so that it would not be possible to turn the shaft as much as a complete revolution and thread the diaphragm unit 13 down into the housing where it might put a permanent set in the leaf spring 23.

Having described above my invention of a novel automatic cut-off mechanism for a hydraulic thermostat it will be readily apparent to those skilled in this art that the desired results have been accomplished with a minimum number of parts and by using operating principles which should bring reliable operation for many years. Also, I have devised a single knob control for the thermostat for affecting either normal cooking operations or an automatic oven cleaning cycle having the automatic cut-out feature.

Other modifications of this invention will occur to those skilled in this art and it is to be understood, therefore, that this invention is not limited to the particular embodiment disclosed but that it is intended to cover all modifications which are within the true spirit and scope of this invention as claimed.

What I claim as new and desire to secure by Letters Patent of the United States is:

1. A temperature responsive control device comprising a housing, an expansible member adjustably mounted in one wall of the housing, said member expanding and contracting according to the direction and extent of temperature change of an external body, and manual control means combined with the expansible member for setting the desired temperature of the device, fixed switch contact means mounted within the housing, a snap-acting spring mechanism supporting movable switch contact means, said spring mechanism being motivated by the expansible member for making and breaking an electric circuit through the fixed contacts, and a lock-out mechanism for disabling the movable contact means in an open circuit position once the temperature reaches a predetermined maximum temperature, said lock-out mechanism including an insulating plate connecting the snap-acting spring mechanism with the movable contact means, a spring-biased pawl supported in the housing for movement toward and away from the said insulating plate, said plate including a keeper portion that is adapted to be engaged by the pawl in one position of the control device for locking the movable contact means in the open circuit position, and an adjustable camming means combined with the expansible member for cooperation with the pawl so that in one normal position the pawl is held away from the said plate, another position of the expansible member and hence the cam freeing the pawl therefrom whereby when the expansible member reaches its position of maximum temperature the insulating plate moves until the pawl is locked therewith to prevent subsequent closing of the contacts until the position of the expansible member and hence the camming means is changed.

2. A temperature responsive control device comprising a housing, an expansible member adjustably mounted through one wall of the housing, said member expanding and contracting according to the direction and extent of temperature change of an external body, and manual control means combined with the expansible member for setting the desired temperature of the device, fixed switch contact means mounted within the housing, a snap-acting spring mechanism supporting a movable switch contact means, said spring mechanism being motivated by the expansible member for making and breaking an electric circuit through the fixed contacts, and a lock-out mechanism for disabling the movable contact means in the open position once the temperature reaches a predetermined maximum temperature, said lock-out mechanism comprising an insulating plate joined with the movable contact means and a spring-biased pawl supported in the housing for movement toward said insulating plate, said plate including a keeper portion which may be engaged by the pawl when the expansible member registers a predetermined maximum temperature for locking the movable contact means in the open circuit position, and adjustable means combined with the expansible member for controlling the action of the pawl depending upon the setting of the manual control means so that the pawl may be disabled for normal operation of the control device.

3. A temperature responsive control device as recited in claim 2 wherein the adjustable means for controlling the pawl represents a cam member positioned on the said expansible member to either support the pawl away from the insulating plate for normal operation of the control device or to release the pawl so that it may lockingly engage the insulating plate when the expansible member registers a predetermined maximum temperature.

4. A snap-acting thermostat comprising a hollow housing, an expansible member adjustably mounted in one wall of the housing, said member expanding and contracting according to the direction and extent of temperature change of an external body, and manual control means combined with the expansible member for setting the desired temperature of the device, fixed switch contact means mounted within the housing, movable switch contact means supported from a snap-acting spring mechanism which is in turn motivated by the expansible member for making and breaking an electric circuit through the fixed contacts, and locking means for holding the movable contact means in the open circuit position when the temperature reaches a predetermined maximum temperature, said locking means including a retractable member for engagement with a portion of the snap-acting spring mechanism, the expansible member including a cam member which disables the said retractable member in all positions but one of the expansible member, said one position serving to free the retractable member from the cam member for locking engagement with the spring mechanism of the movable contact means.

5. A snap-acting thermostat as recited in claim 4 wherein the snap-acting spring mechanism includes an insulating plate for supporting the movable contact means, said retractable member being engageable with a slotted opening in the plate once the movable contacts snap open as the temperature reaches the predetermined maximum temperature.

References Cited in the file of this patent

UNITED STATES PATENTS

| | | |
|---|---|---|
| 2,224,983 | Parkhurst | Dec. 17, 1940 |
| 2,260,014 | Ettinger | Oct. 21, 1941 |
| 2,359,124 | Laidig | Sept. 26, 1944 |
| 2,402,787 | Stickel | June 25, 1946 |
| 2,691,084 | Miller | Oct. 5, 1954 |
| 2,749,407 | Walton et al. | June 5, 1956 |

FOREIGN PATENTS

| | | |
|---|---|---|
| 729,958 | Great Britain | May 11, 1955 |